United States Patent
Kakebayashi et al.

(10) Patent No.: US 8,299,739 B2
(45) Date of Patent: Oct. 30, 2012

(54) MOTOR DRIVE

(75) Inventors: Toru Kakebayashi, Tokyo (JP); Takashi Yamaguchi, Tokyo (JP); Yugo Tadano, Tokyo (JP)

(73) Assignee: Meidensha Corporation, Tokyo (JP)

( * ) Notice: Subject to any disclaimer, the term of this patent is extended or adjusted under 35 U.S.C. 154(b) by 449 days.

(21) Appl. No.: 12/594,731

(22) PCT Filed: Mar. 12, 2008

(86) PCT No.: PCT/JP2008/054478
§ 371 (c)(1),
(2), (4) Date: Oct. 5, 2009

(87) PCT Pub. No.: WO2008/136212
PCT Pub. Date: Nov. 13, 2008

(65) Prior Publication Data
US 2010/0141188 A1    Jun. 10, 2010

(30) Foreign Application Priority Data

Apr. 27, 2007  (JP) .................................. 2007-118171
Jun. 27, 2007  (JP) .................................. 2007-168630

(51) Int. Cl.
*H02P 27/00* (2006.01)
(52) U.S. Cl. ................ 318/400.3; 318/139; 318/400.27; 318/400.32; 318/376; 323/259; 323/344
(58) Field of Classification Search .................. 318/139, 318/400.3, 400.27, 400.32, 376; 323/259, 323/344
See application file for complete search history.

(56) References Cited

U.S. PATENT DOCUMENTS 7,164,253 B2   1/2007  Sato et al.
2008/0247204 A1  10/2008  Renken

FOREIGN PATENT DOCUMENTS

| DE | 40 42 377 A1 | 12/1991 |
|----|---|---|
| DE | 10 2005 041 825 A1 | 3/2007 |
| JP | 5-260787 A | 10/1993 |
| JP | 9-149685 A | 6/1997 |
| JP | 3278188 B2 | 2/2002 |
| JP | 2004-242418 A | 8/2004 |
| JP | 2006-129570 A | 5/2006 |
| WO | WO 03/015254 A1 | 2/2003 |

OTHER PUBLICATIONS

Noguchi, et al., "160,000-r/min, 2.7-kW Electric Drive of Supercharger for Automobiles", PEDS 2005, International Conference, vol. 2, pp. 1380-1385.
Noguchi, et al., "220000 r/min—2 kW PM", *IEEJ Trans. IA*, vol. 125, No. 9, 2005 (9 pages).
Yosuke Takata et al., "Performance Improvement of Mechanical-Sensorless Operation of Pseudo Current-Source Inverter Fed Ultra High-Speed PM Motor", Industrial Application Department Society Department 1-102 in Heisei 17 (2005), pp. 1-375-1-378.

*Primary Examiner* — Walter Benson
*Assistant Examiner* — Erick Glass
(74) *Attorney, Agent, or Firm* — Foley & Lardner LLP

(57) ABSTRACT

[Task] A high-speed driving is possible, a utilization of a power supply having a low voltage is possible, and a regeneration is easy to be carried out.

[Means to solve the task] A first buck-boost chopper portion is provided on an output side of a battery 10 to boost a voltage across battery 10 during a drive of a motor, a second buck-boost chopper portion is provided on an output side of the first buck-boost chopper portion to boost the voltage from an inverter portion 20 during a regeneration, inverter portion 20 of a 120-degree conduction current source inverter is provided on the output side of the second buck-boost chopper portion, and a motor 38 is provided on an output side of inverter portion 20.

6 Claims, 7 Drawing Sheets

PRIOR ART

MOTOR DRIVE

TECHNICAL FIELD

The present invention relates to a motor drive, particularly, relates to the motor drive which can increase a regenerative energy even though a direct current voltage of a power supply thereof is low.

BACKGROUND ART

A patent literature 1 exemplifies a conventional motor drive.

FIG. 7 shows a circuit block diagram thereof. In FIG. 7, 1 denotes a three-phase alternating current power supply, 2 denotes a three-phase diode bridge rectifying circuit, 3 denotes a buck chopper portion having a switching element 3a, a reactor 3b, and a diode 3c, 4 denotes a voltage source three-phase full-bridge inverter portion for supplying a three-phase power to an alternating current motor (PM motor) 5 by a switching action thereof, 6 denotes a regenerative power bypass diode connected in an anti-parallel connection to buck chopper portion 3, 7 denotes an inverter portion control circuit configured to output a switching command to inverter portion 4 in order for a power factor of alternating current motor 5 to be approximately 1, 8 denotes a small-capacitance capacitor installed between output terminals of buck chopper portion 3, 9 denotes a starter circuit, and 39 denotes a smoothing electrolyte capacitor. Inverter portion control circuit 7 includes: a resistance voltage division circuit 7a configured to detect a phase voltage of alternating current motor 5; an integrator 7b which inputs the phase voltage of alternating current motor 5; a capacitor 7c configured to determine a positive or minus of an output of integrator 7b; a photo-coupler 7d which inputs a determination result of comparator 7c; and a logic circuit 7e configured to output a switching command with a signal from photo-coupler 7d as input thereof.

In logic circuit 7e, the switching command is outputted to inverter portion 4 in order for the phase voltage and the phase current to become the mutually same phase.

It should be noted that integrator 7b eliminates noises included in a voltage waveform.

A chopper control circuit to perform a switching of switching element 3a calculates a difference between the switching command value and a current flowing in a reactor 3b through a subtractor 3d and the calculation result is inputted to a PI control portion 3e. Comparator 3f performs a comparison of a magnitude between a reference signal having a predetermined frequency and the output signal of PI control portion 3e and supplies a comparison result signal to switching element 3a as a switching command. Consequently, the flow of an over-current across alternating current motor 5 can be suppressed.

In the motor drive in FIG. 7 described in Patent Literature 1, buck chopper portion 3 is incorporated into an input side of inverter portion 4, regeneration power bypassing diode 6 is connected in anti-parallel connection with respect to buck chopper portion 3, inverter portion 4 is, furthermore, structured in a 120-degree conduction inverter and is controlled as a pseudo current source inverter and both characteristics of the current source inverter and the voltage source inverter can be obtained. In addition, the power factor of alternating current motor 5 is set approximately to 1. Hence, a conduction interval of time of regenerative power bypassing diode 6 can be shortened and can become near to the waveform of the inverter portion can become near to the waveform of the current source inverter. In addition, higher harmonic components can be reduced, a voltage waveform thereof can become near to a sinusoidal waveform, and high efficiency and low noise motor drive can be achieved.

On the other hand, non-patent literature 1 extends the method described in Patent literature 1 to a vehicle mounted electric driven assistance turbocharger inverter, specializing in the buck chopper (pseudo current source inverter) and in a sensor-less drive. A function to boost the voltage from battery voltage of 12 volts is not yet discussed and the circuit structure is a direct current power supply of 72 volts as a premise.

[Patent Literature 1] A Japanese Patent No. 32 78 188

[Non-patent literature 1] Toshihiko Noguchi (Nagaoka University of Technology) titled Performance of Mechanical-Sensorless Operation of Pseudo Current-Source Inverter Fed Ultra High-Speed PM motor

DISCLOSURE OF THE INVENTION

Problem to be Solved by the Invention

In the motor drive shown in FIG. 7, a current flowing through reactor 3b of buck chopper portion 3 is detected and is feedback controlled arbitrarily. This provides a direct current supply and subsequent stage of inverter portion 4 is of the pseudo current source inverter and is configured to drive alternating current motor 5 in the 120-degree conduction inverter form. However, since the three-phase alternating voltage from three-phase alternating current supply 1 is rectified via rectifier circuit 2, it is not considered that a regeneration utilization of the energy based on an induced voltage of alternating current motor 5 is carried out. Therefore, in a case where a terminal voltage across electrolyte capacitor 39 is lower than an output terminal voltage of reactor 3b, regenerative power bypassing diode 6 is not conducted. Thus, the energy cannot be regenerated in a case where the inducted voltage of alternating current motor 5 is low. In addition, since, in the circuit structure in FIG. 7, in a case where the direct-current voltage of inverter portion 4 is low, alternating current motor 5 cannot be controlled if a terminal voltage of alternating current motor 5 is lower than a direct current voltage across inverter portion 4. The terminal voltage of alternating current motor 5 is accordingly reduced. In such a case as described above, in order to secure an output of alternating motor 5, a large motor current is needed, the motor current is accordingly increased, and windings of alternating current motor 5 becomes thick. Thus, a manufacturing of the circuit structure becomes difficult, a size of inverter portion 4 becomes large, and a loss becomes accordingly increased. To prevent this loss, a method in which the power supply voltage of the battery is made high has been considered. However, since 12-volt or 24-volt lead-acid battery is used for a vehicle mounted motor, this battery power supply cannot be used if the power supply voltage is made high and another high-voltage battery is needed to be mounted. Thus, the reduction of the number of parts and the cost reduction cannot be achieved.

In addition, in general, at a time during which a high-speed motor is driven, an output frequency of inverter portion 4 becomes very high. In addition, in a case where the high-speed motor is controlled, a revolution sensor cannot be disposed, a sensor-less drive is accordingly needed, and a calculation time of the CPU is increased. Furthermore, in order to cope with a high output frequency, it is necessary to increase a carrier frequency in a case of a PWM control.

In addition, to reduce a centrifugal force, the high-speed motor is needed to become a small diameter. Winding coils of the high-speed motor has small-diameter coils and reactor L of the windings becomes accordingly small. In order to drive the motor having such a small reactor L, it is necessary to increase the carrier frequency and there is a limitation on a CPU capability in the sensor-less PWM driving at the high carrier frequency.

Furthermore, the terminal voltage of alternating current motor 5 is lower than a direct-current side voltage of inverter portion 4. Therefore, a voltage boosting of the terminal voltage of alternating current motor during the regeneration is needed. However, if a rate of voltage boosting is high, a loss is large, and, in an actual matter of fact, the regeneration cannot be performed to a large degree.

On the other hand, in non-patent literature 1, the input portion described in patent literature 1 is replaced with the direct-current voltage supply such as battery and applied to a case of a super high-speed sensor-less drive of a vehicle mounted electrical power assisted turbo charger. Then, non-patent literature 1 makes possible a two-segment driving of an acceleration driving and a regeneration driving by making a chopper circuit portion a bi-directional driving, namely, the buck chopper as viewed from the power supply side and a boost chopper as viewed from the load side. However, a 72-volt direct current voltage supply which is sufficiently high with respect to the induced voltage of the alternating current is prerequisite to this method. In a case where a 12-volt battery which would be considered for the vehicle mount, such as an alternating current motor having sufficiently a low induced voltage is needed. This is extremely difficult to be mounted and to be manufactured as viewed from an actual practice and a manufacturing practice. Hence, in an application of the vehicle mounted electric motor driven assistance turbo charger on which a 12-volt battery is mounted, a method in which the pseudo current type control is executed by means of the buck chopper after the power is once boosted is flawless. In either case, non-patent literature 1 does not touch the boosting operation.

With the above-described tasks to be solved in mind, it is an object of the present invention to provide a motor drive which is capable of performing a high-speed revolution of an alternating current motor, capable of utilizing an on-vehicle battery, capable of small sizing an inverter portion with an ease in a manufacture of the motor by using the alternating current motor at a high rated voltage, and capable of extending a range of the regeneration.

Means to Solve the Problem

The motor drive recited in claim 9 according to the present invention, comprises: a direct current power supply; a first buck-boost chopper portion which boosts a voltage of the direct current power supply to provide a direct current power of an inverter portion during a time at which a motor is driven; and a second buck-boost chopper portion configured to boost the direct current voltage of the inverter portion to regenerate a power to the direct current power supply during a time of a regeneration of the motor, the inverter portion being a 120-degree conduction current source inverter and being configured to convert the direct current power of the inverter portion into a multi-phase alternating current power to drive the motor and to convert the multi-phase alternating power into the direct current power to regenerate an electrical power of the motor.

The motor drive recited in claim 10 according to the present invention, comprises: a first buck-boost chopper portion configured to boost a voltage of an electrically connected external direct current power supply to provide a direct current power of an inverter portion during a time at which a motor is driven; and a second buck-boost chopper portion configured to boost the direct current voltage of the inverter portion to regenerate a power to the external direct current power supply during a regeneration of the motor, the inverter portion being a 120-degree conduction inverter and being configured to convert a direct current power of the inverter portion into a multi-phase alternating current power to drive the motor and to convert the multi-phase alternating power into the direct current power to regenerate an electric power of the motor.

In the motor drive recited in the claim 11, the motor drive further comprises a diode having an anode connected between a reactor of the second buck-boost chopper portion and a direct current positive side of the inverter portion, having a cathode connected to a positive side of a capacitor of the second buck-boost chopper portion, and suppressing a voltage rise in the inverter portion during a gate turn off of the inverter portion.

In the motor drive recited in the claim 12, in a low-speed driving region of the motor in which it is unnecessary to boost the voltage of the direct current power supply, a voltage boosting operation of the first buck-boost chopper portion is halted.

In the motor drive recited in claim 13, at least one or more of a motor revolution number, a motor current, a motor terminal voltage, a motor temperature, a direct current voltage of the inverter portion, to start the voltage boosting operation, is set, if a command value, a detection value, or an estimation value of number of revolutions of the motor, a command value or a detection value of the current of the motor, a command value or a detection value of the terminal voltage across the motor, a detection value of the temperature of the motor, or a detection value of the direct current voltage of the inverter portion is equal to or larger than this set value, the first buck-boost chopper portion is activated, and a feedback control is started in order for the direct current voltage boosted by the first buck-boost chopper portion to become a predetermined voltage.

In the motor drive recited in the claim 14, a command value of the direct current voltage to be boosted by the first buck-boost chopper portion is set in accordance with at least one or more of a detection value, a command value, or an estimation value of the motor revolution number, the detection value or the command value of a motor current, the detection value of a motor temperature, the detection value or the command value of a motor terminal voltage, and the detection value of the direct current voltage of the inverter portion and a feedback control is carried out in order for the direct current voltage boosted by the first buck-boost chopper portion to provide this command value.

In the motor drive recited in the claim 15, if the revolution number of the motor is raised and an induced voltage of the motor becomes equal to or higher than the boosted direct current voltage of the first buck-boost chopper portion, an operation of the first buck-boost chopper portion is halted.

Effects of the Invention

As described hereinabove, in claim 9 according to the present invention, the inverter portion is the 120-degree conduction inverter portion. The number of times the switching is performed is reduced and, hence, this inverter portion is suitable for the control of the motor performing the high-speed revolution. In addition, during the drive of the motor, after the voltage is boosted by means of the first buck-boost chopper portion to a direct current voltage which can sufficiently drive a motor load, the motor is driven by means of the pseudo current source inverter and the second buck-boost chopper portion, the pseudo current source inverter being constituted by the 120-degree conduction inverter. Thus, even if an induced voltage exceeding the battery voltage during the high-speed revolution is generated, it becomes possible to perform an acceleration driving (or power driving) not only the regeneration driving. In addition, the terminal voltage across the motor can become high. A large current is not necessary and a thickening of winding of the motor is not necessary. The motor can easily be manufactured. The inverter portion can be small sized with a reduced loss. It goes without saying that another high voltage battery mounted at another portion is not necessary. In addition, the first buck-boost chopper portion boosts the voltage of the battery during the driving of the motor, a motor having a high rated voltage can be used. Hence, the regeneration from the high reduced voltage can become possible and the regeneration becomes easy to be performed. In addition, the on-or-off control of the switching element permits the revolution of the motor at a voltage lower than the battery voltage.

According to the claim 10, the first buck-boost chopper portion boosts the voltage across the external direct current power supply connected electrically during the drive of the motor, the same advantage as the claim 9 can be obtained.

According to the claim 11, the diode is connected in the anti-parallel connection to the second buck-boost chopper portion, this diode bypassing an output of the second buck-boost chopper portion during the gate turn off of the inverter portion to the output side of the first buck-boost chopper portion, a rise in the voltage of the inverter portion can be suppressed, and a destruction of each of the switching elements can be prevented.

According to the claim 12, in the low-speed driving region in which it is unnecessary to boost the voltage of the direct current supply, the boosting operation of the first buck-boost chopper portion is halted, the switching element required for boosting operation of the first buck-boost chopper portion, a short-circuit current of the reactor are not needed, and the partial load efficiency can be improved.

According to the claim 13, at least one or more of the motor revolution numbers, the motor terminal voltage, the motor temperature, the direct current voltage of the inverter portion are set, if the command value, the detection voltage and, if the detection value of the motor temperature, or the detection value of the direct current voltage of the inverter portion is equal to or larger than the set value, the feedback control is started in order for the boosted direct current voltage of the first buck-boost chopper portion to provide the predetermined voltage. Since the boosting operation is not carried out at the first buck-boost chopper portion in the low-speed revolution region of the motor can be driven sufficiently in the high-speed revolution region, the efficiency can be improved according to the feedback control.

According to the claim 14, the command value of the direct current voltage to be boosted by the first buck-boost chopper portion is set in accordance with at least one or more of the detection value, the command value, or the estimation value of the revolution number of the motor, the detection value or the command value of the motor current, the detection value of the motor temperature, the command value or the detection value of the motor terminal voltage, and the detection value of the direct current voltage of the inverter portion, the feedback control is carried out in order for the direct current voltage boosted by the first buck-boost chopper portion to provide the command value set as described above, and the command value of the direct current voltage to be boosted by the first buck-boost chopper portion is set in accordance with the revolution number of the motor, the current of the motor, the temperature of the motor, the terminal voltage of the motor, the direct current voltage of the inverter portion. The direct current voltage command value which is instantaneously varied in accordance with the motor revolution number, the motor current, the motor temperature, the motor terminal voltage, and the direct current voltage of the inverter portion.

According to the claim 15, if the induced voltage of the motor becomes higher than the direct current voltage boosted by the first buck-boost chopper portion, the acceleration driving is impossible but the power regeneration driving is carried out for the direct current power supply via the first buck-boost chopper portion. Therefore, a large regeneration current is caused to flow through the direct current power supply. Thus, an excessively large regeneration current is caused to flow to the direct current power supply and there is a possibility of the direct current power supply to cause an excessive current failure. Therefore, the operation of the first buck-boost chopper portion is halted and the damage of the direct current power supply due to the regeneration excessive current can be prevented.

BEST MODE FOR CARRYING OUT THE INVENTION

First Embodiment 1

Hereinafter, a best mode for carrying out the invention will be described with reference to the drawings. FIG. 1 shows a circuit diagram of a high-speed motor drive in a first best mode embodiment 1 according to the present invention. 10 denotes a battery. C1 denotes a capacitor connected in parallel to battery 10. L1 denotes a reactor connected in series with battery 10, 11 denotes a switching element connected in parallel to battery 10 via reactor L1, 12 denotes a flywheel diode connected in anti-parallel to switching element 11, 13 denotes a switching element connected in series with reactor L1, 14 denotes a flywheel diode connected in anti-parallel to switching element 13, C2 denotes a capacitor connected in parallel to serially connected switching element 11, 13, 15 denotes a switching element connected in series with switching element 13, 16 denotes a flywheel diode connected in anti-parallel to switching element 15, 17 denotes a switching element connected in parallel to capacitor C2 via switching element 15, 18 denotes a flywheel diode connected in anti-parallel to switching element 17, L2 and 19 denote a reactor and a current detector connected in series with switching element 15, an output of reactor 12 being supplied to a three-phase bridge inverter portion 20 of switching elements 21~26, and a three-phase output of inverter portion 20 being supplied to an alternating current motor 38. Inverter portion 20 is a 120-degree conduction current source inverter and is constituted by six switching elements 21~26 and flywheel diodes 27~32 connected in anti-parallel to these switching elements 21~26.

33 denotes a resistance voltage division circuit to detect a phase voltage of alternating current motor 38, 35 denotes an integrator for an integration, 36 denotes a comparator to determine a plus or minus of an output of integrator 35. Comparator 36 outputs a switching command to a gate drive circuit 37 for switching elements 21~26 and is designed to make the same phase between a phase voltage and a phase current.

Next, an operation of the above-described structure will be described. First of all, at a time at which a drive of the alternating current motor is carried out, a turn on of switching element 11 causes a direct current voltage from battery 10 to flow into reactor L1 to store an energy into reactor L1. Thereafter, when switching element 11 is turned off, a voltage boost occurs due to the energy stored in reactor L1 and an electrical charge occurs in capacitor C2. The charge is possible even if direct current Vdc is high. At this time, switching element 11 is turned on and off to make voltage across capacitor C2 constant to perform a voltage control (AVR).

In addition, the turn on of switching element 15 causes a current to flow into reactor L2 to store the energy in reactor L2. If switching element 15 is turned off, the energy stored in reactor L2 causes a current to be continued to flow into reactor L2 via flywheel diode 18 and via any two of switching elements of inverter 20 which are conducted. This current is detected by means of current detector 19, or a revolution speed of alternating current motor 38 is detected, or the revolution speed is estimated from a waveform based on a gate signal. The on-and-off control of switching element 15 in order for the current or the revolution speed to reach to a target value thereof to perform a current control (ACR) or a speed control (ASR).

Inverter portion 20 inputs a direct current (DC current) from reactor L2, converts this into a three-phase alternating (AC) current to output it to alternating current motor 38. Resistance voltage division circuit 33 detects the phase voltage of alternating current motor 38, the phase voltage being integrated by integrator 35. Comparator 36 determines a positive value or a negative value of the output of integrator 35. The result of determination by the comparator is inputted to gate drive circuit 37. Six switching elements 21~26 constituting inverter portion 20 are on-and-off driven at a timing shown in FIG. 2 in accordance with a magnetic pole position of alternating current motor 38 to operate a 120-degree conduction type pseudo current source inverter. In FIG. 2, (a) shows an induced voltage of each phase (of AC motor), (b) shows an interlinkage magnetic flux of each phase thereof, and (d) shows a magnetic flux phase pulse of each phase thereof, (e) shows a gate signal thereof, and (f) shows six conducting modes.

Next, an operation when a regeneration is carried out will be described below. When the regeneration occurs, alternating current motor 38 develops the induced voltage in proportion to the number of revolutions. At this time, if switching elements 17 is turned on, the current is caused to flow into any two of flywheel diodes 27~32 to cause a current flow into reactor L2 to store the energy into reactor L2. At this time, if switching element 17 is turned off, the energy stored into reactor L2 boosts the direct current voltage of inverter portion 20 and the current is caused to flow via flywheel diode 16 to charge capacitor C2. At this time, even if the induced voltage of motor 38 is low, the charge of capacitor C2 is possible. The current control (ACR) or the speed control of alternating current motor 38 to make the current constant through switching element 17 or the power control (APR) to make an electrical power constant is carried out. At this time, the regeneration power from motor 38 causes the regeneration of electric power to battery 10 by a power corresponding to a boosting of direct current voltage Vdc.

In addition, when the electric power is regenerated to battery 10, switching element 13 is turned on. At this time, since the current is caused to flow into reactor L1 to store the energy into reactor L1. If switching element 13 is turned off, the energy in reactor L1 causes the current to flow continuously via flywheel diode 12 to cause the continuous charge current to flow irrespective of the on-or-off of switching element 13.

As described hereinabove, reactor L1, switching elements 11, 13, and diodes 12, 14 constitute a first buck-boost chopper portion.

In addition, a second buck-boost chopper portion is constituted by switching elements 15, 17, and reactor L2, and flywheel diodes 16, 18.

In first embodiment 1, inverter portion 20 is a 120-degree conduction current source inverter. Thus, since the number of times the switching between on and off is performed can be reduced, it is suitable to be applied to a control of high-speed alternating current motor 38. In addition, first buck-boost chopper portion during the drive causes the voltage across battery 10 to be boosted. For example, thus, in a case where a low voltage vehicle use battery 10 of 12-volt system is, for example, used, the voltage boosting action of first buck-boost chopper portion boosts to a direct current voltage at which a motor load can sufficiently be driven and, thereafter, the second buck-boost chopper portion and 120-degree conduction inverter portion 20 to drive alternating current motor 38. In a motor in which the induced voltage is developed such as PM motor, even if the induced voltage exceeding the voltage across battery 10 is developed during the high-speed revolution, an acceleration driving is also possible not only a regenerative driving. In addition, since the direct current voltage of inverter portion 20 and a terminal voltage across alternating current motor 38 can be made high, windings of alternating current motor 38 can be thinned. The manufacturing of alternating current motor 38 can be facilitated, a small-sizing of inverter portion 20 can become possible, and the drive of a motor having a high rated voltage can become possible even though the low-voltage battery is used. In addition, first buck-boost chopper portion boosts the voltage across the battery during the drive thereof. Since the motor having the high rated voltage can be used, the regeneration from the portion having the high induced voltage can be achieved. Thus, a circuit easy in regeneration can be achieved.

Furthermore, inverter portion 20 is of the current source inverter and the torque control according to the current value is carried out, as compared with a voltage source inverter in which the torque control is carried out according to a voltage value. Thus, a control response becomes fast and it is suitable for the drive of the motor which is revolved at the high speed. Furthermore, a voltage drop operation of the second buck-boost chopper circuit (the on-and-off control of switching element 15) permits the revolution of motor 38 at the voltage lower than the battery voltage.

Second embodiment 2

FIG. 3 shows a circuit diagram of the motor drive in a second best mode embodiment 2 according to the present invention. In FIG. 3, D1 denotes a diode connected in the anti-parallel to the second buck-boost chopper portion, an anode thereof being connected between reactor L2 and a positive direct current side of inverter portion 20 and a cathode thereof being connected to a positive side of capacitor C2. The other structures are the same as those of first best mode embodiment 1. This diode D1 causes the energy stored in reactor L2 to flow into capacitor C2 during the gate turn-off of inverter portion 20 to enable a suppression of the voltage boost in inverter portion 20, to enable the suppression of the rise in direct current voltage Vdc of inverter portion 20, and to enable a prevention of a damage of respective switching elements 21~26 constituting inverter portion 20. The other effects are the same as those in first best mode embodiment 1.

It should be noted that, in each of best mode embodiments described before, the battery is used as the direct current power supply but another external direct current power supply may be used.

Third embodiment 3

FIG. 4 shows a circuit diagram of the motor drive in a third best mode embodiment 3. A method of depicting the circuit diagram is merely changed but the circuit structure is the same as each of first and second best mode embodiments 1, 2 and the operation is the same as that described in each of the first and second best mode embodiments 1, 2. It is, however, noted that a gate control circuit of inverter portion 20, a current control circuit of reactor L2 of second buck-boost chopper portion, and so forth are omitted from FIG. 4 and the gate control circuit is the same as shown in FIGS. 1 and 3. In each of best mode embodiments 1 and 2, first buck-boost chopper portion boosts direct current voltage Vdc at which alternating current motor 38 can sufficiently be driven up to a high-speed revolution region. Even at the high-speed revolution region, the acceleration operation and the regeneration operation can be achieved. On the other hand, in a low-speed revolution region such as the PM motor, the acceleration driving and the regeneration driving are possible at the voltage across battery 10, in spite of the fact that the voltage boost driving operation is not carried out, in a case where the induced voltage of alternating current motor 38 is insufficiently lower than the voltage across battery 10. In such a case as described above, namely, in the low-speed driving region in which it is not necessary to boost the voltage equal to or larger than the voltage across battery 10, the boosting operation of the first buck-boost chopper portion is halted. Specifically, switching element 13 is, at all times, turned on and switching element 11 is, at all times, turned off so as to make direct current voltage Vdc coincident with the voltage across battery 10.

In third best mode embodiment 3, in the low-speed revolution region in which the induced voltage of alternating current motor 38 is sufficiently lower than the voltage across battery 10, the voltage boosting operation of the first buck-boost chopper portion is halted. Thus, switching element 11 required for the voltage boosting operation and a short-circuit current flowing from battery 10 to reactor L1 are not needed and a partial load efficiency is improved. In addition, since switching element 13 is, at all times, turned on, the current can be caused to flow not only at the time of the motor drive but also the time at which the regeneration is carried out.

Fourth embodiment 4

In a case where the induced voltage of alternating current motor 38 or a motor drive torque is needed to be equal to or higher than the voltage across battery 10, it is necessary to boost the direct current voltage of battery 10 by means of the first buck-boost chopper portion. Therefore, according to a load of alternating current motor 38, at least one or more of revolution number, current, terminal voltage of alternating current motor 38, and a direct current voltage of the inverter portion to start the boosting operation of the first buck-boost chopper portion is preset. That is to say, as shown in FIG. 5, a command value, a detection value, or an estimation value of the revolution number of alternating current motor 38, the command value or the detection value of the motor current, the command value or the detection value of the motor current, the command value or the detection value of the motor terminal voltage, or the detection value of the direct current voltage of the inverter portion and a set value therefor are inputted to a chopper operation determining section 40. If the detection value and so forth of the revolution number, the motor current, the motor terminal voltage, the motor temperature, or the direct current voltage of the inverter portion is equal to or larger than the set value, a command value of direct current voltage Vdc to be boosted by the first buck-boost chopper portion is outputted from chopper operation determining section 40, this command value being inputted to voltage feedback control means 41 together with the detection value of the direct current voltage Vdc. An on-or-off command is outputted from the feedback control means 41 to a gate of switching element 11 of the first buck-boost chopper portion so that the command value is made coincident with the detection value. The feedback control of direct current voltage Vdc is performed to control alternating current motor 38 to a fixed voltage value at which alternating current motor 38 to a fixed voltage value at which alternating current motor 38 is sufficiently driven. The circuit structure of the motor drive in this embodiment is shown in FIG. 4.

In fourth best mode embodiment 4, in the low-speed revolution region in which alternative current motor 38 is revolved at the low speed, the voltage boosting operation of the first buck-boost chopper portion is not carried out. Hence, a partial load efficiency is improved. In the high-speed revolution region, the feedback control of direct current voltage Vdc boosted by the first buck-boost chopper portion is started. The boosted direct current voltage Vdc can provide the fixed voltage value at which alternating current motor 38 can sufficiently be driven and the efficiency can be improved even in the high-speed revolution region.

Fifth embodiment 5

In a fifth best mode embodiment 5, the command value of direct current voltage Vdc boosted by the first buck-boost chopper portion is set in accordance with at least one or more of the detection value, the command value, or the estimation value of the revolution number of alternating current motor 38, the detection value or command value of the motor current, or the motor temperature detection value, the detection value or the command value of the terminal voltage of the motor, and the detection value of the direct current voltage of the inverter portion. In the fifth best mode embodiment 5, the circuit structure of the motor drive is shown in FIG. 4 and, in addition to this, the control shown in FIG. 6 is carried out. That is to say, at least one or more of the values of the detection value, the command value, or the estimation value of the revolution number of alternating current motor 38, the detection value or the command value of the motor current, the detection value of the motor temperature, the detection value or the command value of the motor terminal voltage, and the detection value of the direct current voltage of the inverter portion are inputted to a voltage command generating section 42. Voltage command generating section 42 sets the command value of the direct current voltage Vdc boosted by the first buck-boost chopper portion is set in accordance with the inputted value(s). This command value is inputted to voltage feedback control means 43 together with the detection value of direct current voltage Vdc. Voltage feedback control means outputs the on-or-off command to the gate of switching element 11 of the first buck-boost chopper portion to perform the feedback control over direct current voltage Vdc so as to make the command value coincident with the detection value thereof. For example, the terminal voltage across alternating current motor 38 is detected, a voltage slightly higher than this terminal voltage being set to the voltage command value of boosted direct current voltage Vdc of the first buck-boost chopper portion to perform the voltage control (AVR). Thus, a current flowing into switching element 11 or 17 or diodes 12, 18 can be reduced so that the loss reduction of the motor drive can be achieved. The induced voltage of alternating current motor 38 may be estimated from the revolution number of alternating current motor 38 without detection thereof.

In fifth best mode embodiment 5, the command value of direct current voltage Vdc to be boosted by the first buck-boost chopper portion in accordance with the revolution speed of alternating current motor 38, the motor current, the motor temperature, the terminal voltage of the motor, and the direct current voltage of the inverter portion is momentarily varied. Thus, the motor drive can prevent the worsening of the partial load efficiency with the voltage boosting more than necessary and the feedback control can improve the efficiency from the low-speed region to the high-speed region.

Sixth embodiment 6

In a sixth best mode embodiment 6, the circuit structure of the motor drive is shown in FIG. 4. In a case where the revolution number of alternating current motor 38 is increased and the induced voltage of alternating current motor 38 becomes higher than direct current voltage Vdc boosted by the first buck-boost chopper portion, the acceleration driving higher than direct current voltage Vdc boosted by the first buck-boost chopper portion, the acceleration driving becomes no more possible. However, for the regeneration driving, the regeneration current is caused to flow via flywheel diodes 27~32 of inverter portion 20 irrespective of the control of 120-degree conduction inverter portion 20 and the direct current control of the second buck-boost chopper portion. At this time, if the first buck-boost chopper portion is in the driving state, the corresponding regeneration current is caused to flow into battery 10 via switching element 13 of the first buck-boost chopper portion. Is should be noted that this regeneration current has no relation to the current control of the second buck-boost chopper portion and is a value determined according to a leak resistance value of alternating current motor 38 and an electrical potential difference between the induced voltage and direct current voltage Vdc boosted by the first buck-boost chopper portion. Hence, in a case where this potential difference is large and the leak resistance value of alternating current motor 38 is remarkably small, an excessive regeneration current is regenerated into battery 10. A damage of battery 10 due to an over-current occurs. Thus, in sixth best mode embodiment 6, in a case where the number of revolutions of alternating current motor 38 is raised and the induced voltage of alternating current motor 38 becomes higher than direct current voltage Vdc boosted by the first buck-boost chopper portion, switching element 13 of the first buck-boost chopper portion is forcefully turned off. Then, the regenerative excessive current does not flow into battery 10 so as to prevent the damage of battery 10. It should be noted that the induced voltage of alternating current motor 38 may directly be detected or the induced voltage may be estimated from the number of revolutions.

Even in a case where, in sixth best mode embodiment 6, the induced voltage becomes larger than the boosted direct current voltage in the high-speed revolution region, the damage of battery 10 due to the regeneration excessive current can be prevented.

EXPLANATION OF SIGNS

Figure 1:
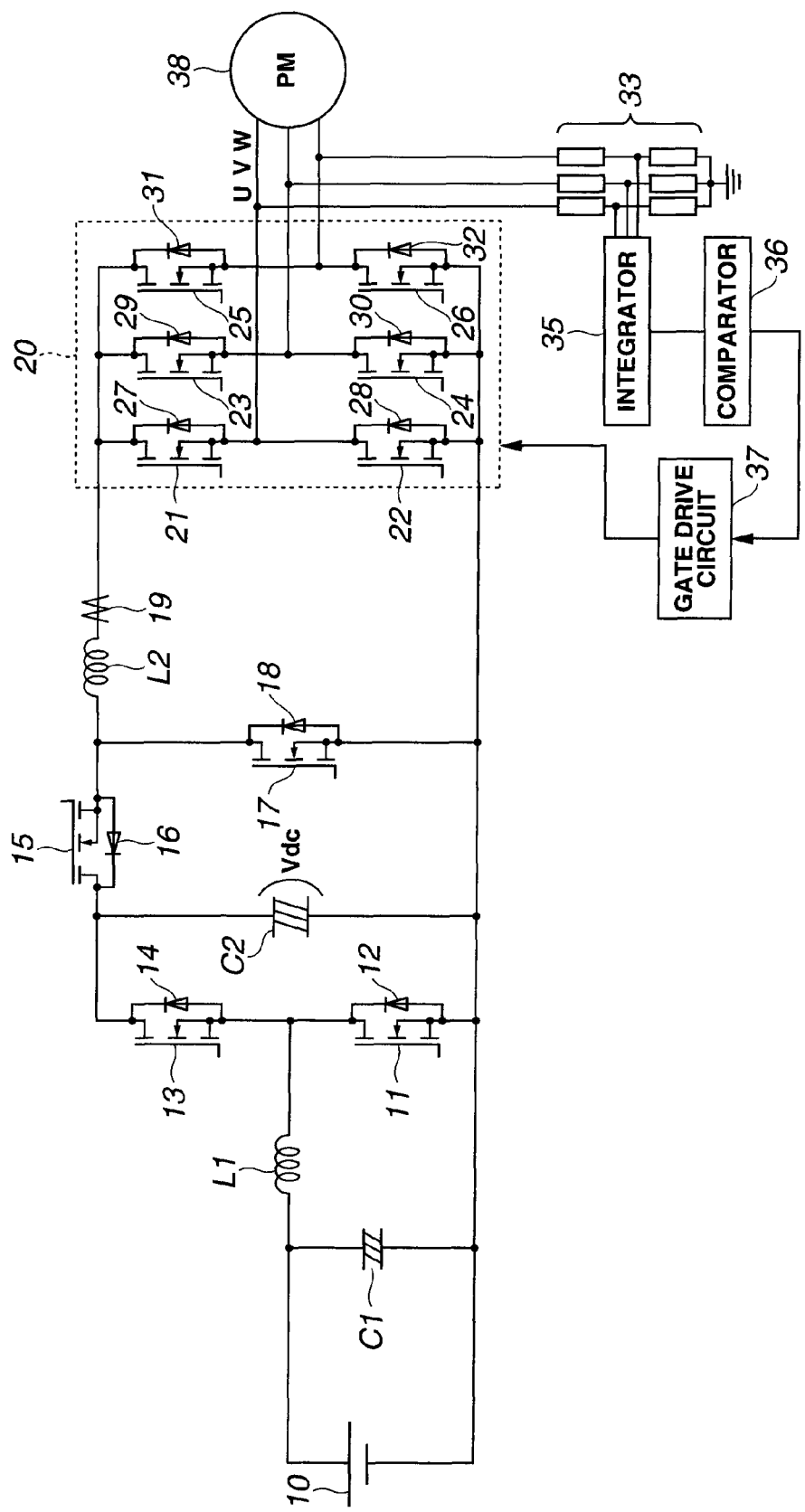
FIG. 1 a circuit structure diagram of the motor drive in a first best mode embodiment 1 according to the present invention.
Figure 2:
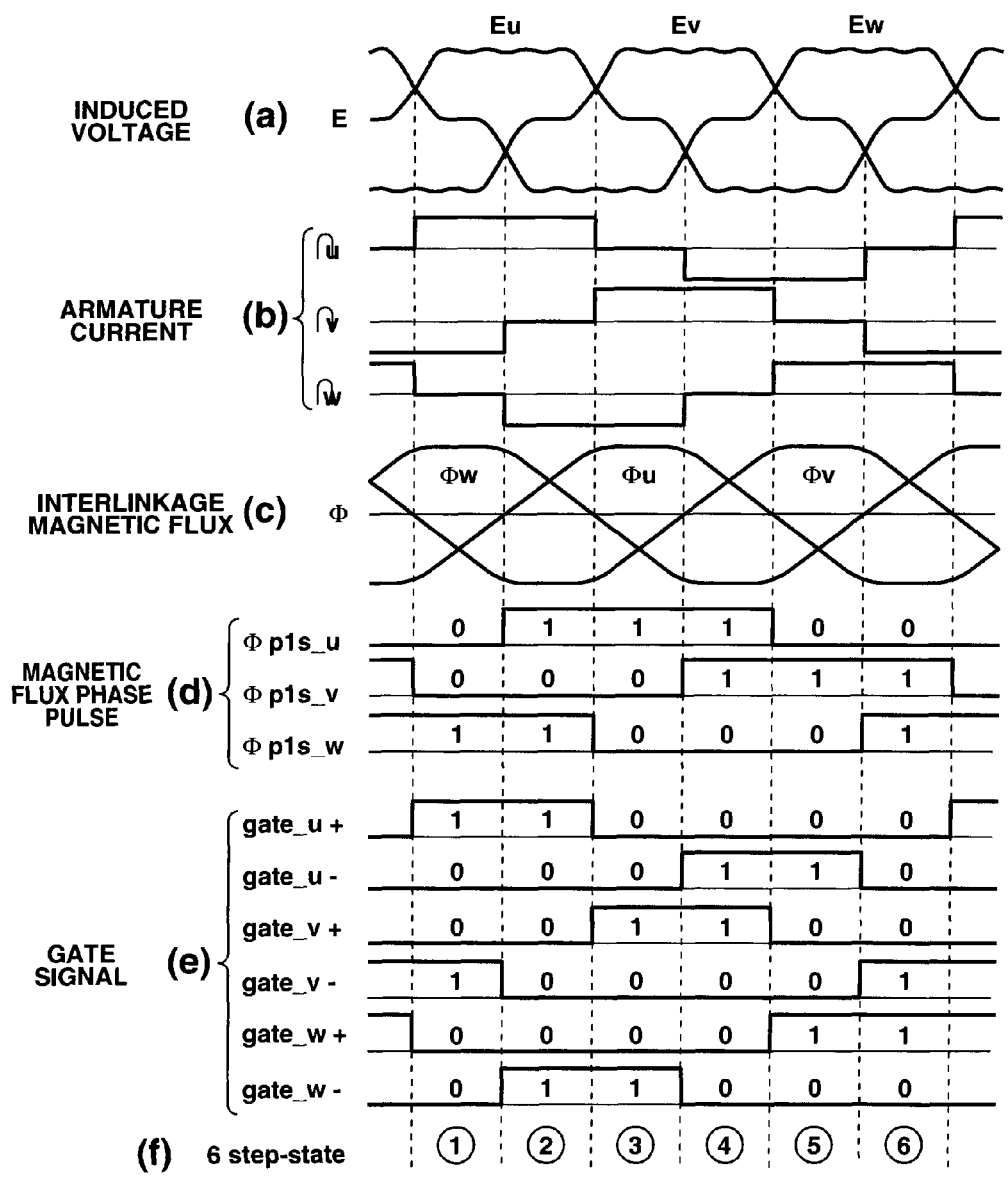
FIG. 2 an operation waveform chart of the motor drive in the first best mode embodiment 1.
Figure 3:
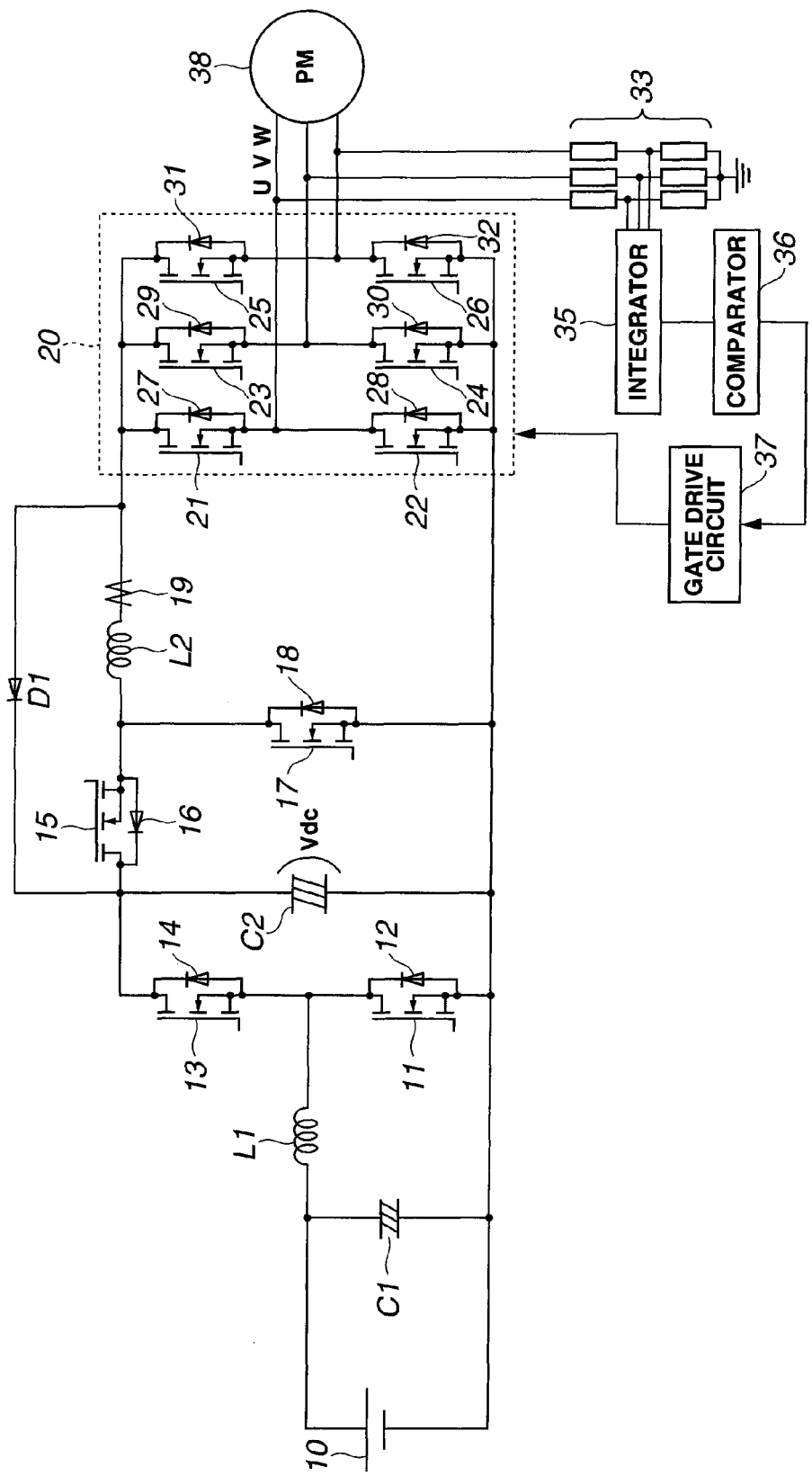
FIG. 3 a circuit structure diagram of the motor drive in a second best mode embodiment 2.
Figure 4:
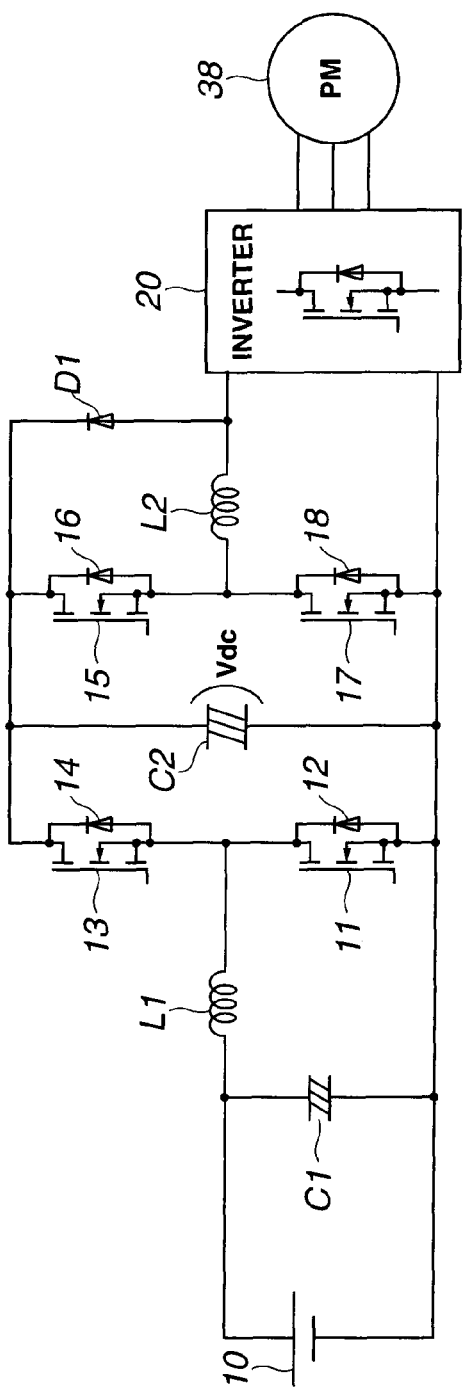
FIG. 4 a circuit structure diagram of the motor drive in a third best mode embodiment 3.
Figure 5:
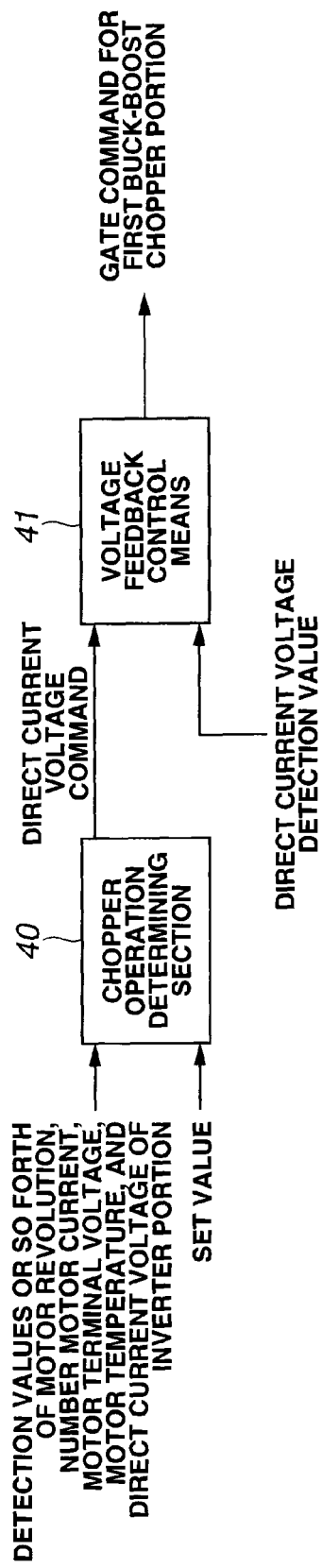
FIG. 5 a control block diagram of a first buck-boost chopper portion in a fourth best mode embodiment 4.
Figure 6:
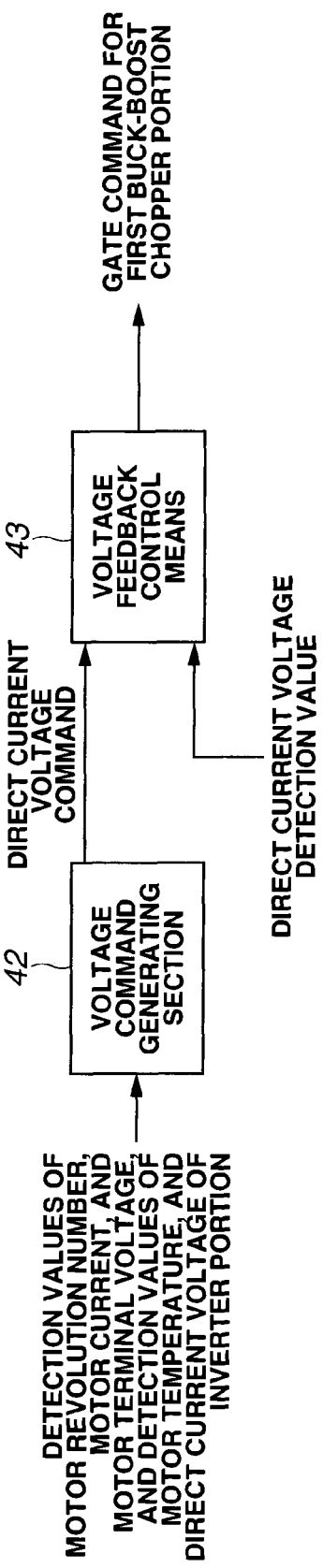
FIG. 6 a control block diagram of a first buck-boost chopper portion in a fifth best mode embodiment 5.
Figure 7:
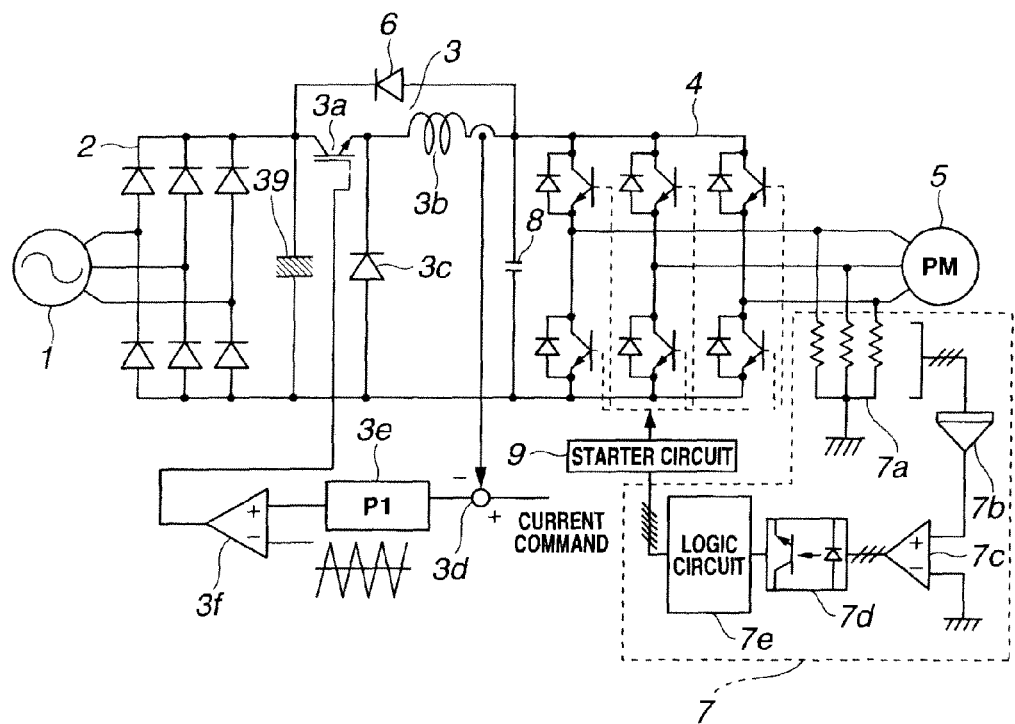
FIG. 7 a circuit structure diagram of a conventional motor drive described in a Patent Literature 1.

10 . . . battery
11, 13, 15, 17, 21~26 . . . switching elements
12, 14, 16, 18, 27~32 . . . flywheel diodes
20 . . . inverter portion
38 . . . alternating current motor
40, 42 . . . voltage command generating section
41, 43 . . . voltage feedback control means
C1, C2 . . . capacitor
L1, L2 . . . reactor
D1 . . . diode

The invention claimed is:

1. A motor drive comprising:
a direct current power supply;
a first buck-boost chopper portion which boosts a voltage of the direct current power supply to provide a direct current power of an inverter portion during a time at which a motor is driven; and
a second buck-boost chopper portion configured to boost the direct current voltage of the inverter portion to regenerate a power to the direct current power supply during a time of a regeneration of the motor,
the inverter portion being a 120-degree conduction current source inverter and being configured to convert the direct current power of the inverter portion into a multi-phase alternating current power to drive the motor and to convert the multi-phase alternating power into the direct current power to regenerate an electrical power of the motor, and a diode having an anode connected between a reactor of the second buck-boost chopper portion and a direct current positive side of the inverter portion, having a cathode connected to a positive side of a capacitor of the second buck-boost chopper portion, and suppressing a voltage rise in the inverter portion during a gate turn off of the inverter portion.

2. The motor drive as claimed in claim 1, wherein, in a low-speed driving region of the motor in which it is unnecessary to boost the voltage of the direct current power supply, a voltage boosting operation of the first buck-boost chopper portion is halted.

3. The motor drive as claimed in claim 1, wherein at least one or more of a motor revolution number, a motor current, a motor terminal voltage, a motor temperature, a direct current voltage of the inverter portion, to start the voltage boosting operation, is set, if a command value, a detection value, or an estimation value of number of revolutions of the motor, a command value or a detection value of the current of the motor, a command value or a detection value of the terminal voltage across the motor, a detection value of the temperature of the motor, or a detection value of the direct current voltage of the inverter portion is equal to or larger than this set value, the first buck-boost chopper portion is activated, and a feedback control is started in order for the direct current voltage boosted by the first buck-boost chopper portion to become a predetermined voltage.

4. The motor drive as claimed in claim 1, wherein a command value of the direct current voltage to be boosted by the first buck-boost chopper portion is set in accordance with at least one or more of a detection value, a command value, or an estimation value of the motor revolution number, the detection value or the command value of a motor current, the detection value of a motor temperature, the detection value or the command value of a motor terminal voltage, and the detection value of the direct current voltage of the inverter portion and a feedback control is carried out in order for the direct current voltage boosted by the first buck-boost chopper portion to provide this command value.

5. The motor drive as claimed in claim 1, wherein, in a case where the revolution number of the motor is raised and an induced voltage of the motor becomes equal to or higher than the boosted direct current voltage of the first buck-boost chopper portion, an operation of the first buck-boost chopper portion is halted.

6. A motor drive comprising:
a first buck-boost chopper portion configured to boost a voltage of an electrically connected external direct current power supply to provide a direct current power of an inverter portion during a time at which a motor is driven; and
a second buck-boost chopper portion configured to boost the direct current voltage of the inverter portion to regenerate a power to the external direct current power supply during a regeneration of the motor, the inverter portion being a 120-degree conduction current source inverter and being configured to convert a direct current power of the inverter portion into a multi-phase alternating current power to drive the motor and to convert the multi-phase alternating power into the direct current power to regenerate an electric power of the motor, and a diode having an anode connected between a reactor of the second buck-boost chopper portion and a direct current positive side of the inverter portion, having a cathode connected to a positive side of a capacitor of the second buck-boost chopper portion, and suppressing a voltage rise in the inverter portion during a gate turn off of the inverter portion.

\* \* \* \* \*